Sept. 11, 1923.
A. L. RIKER
1,467,591
SPEED CHANGING DEVICE AND TAKE-UP OF CHAIN DRIVES OR THE LIKE
Filed April 26, 1921   2 Sheets-Sheet 1
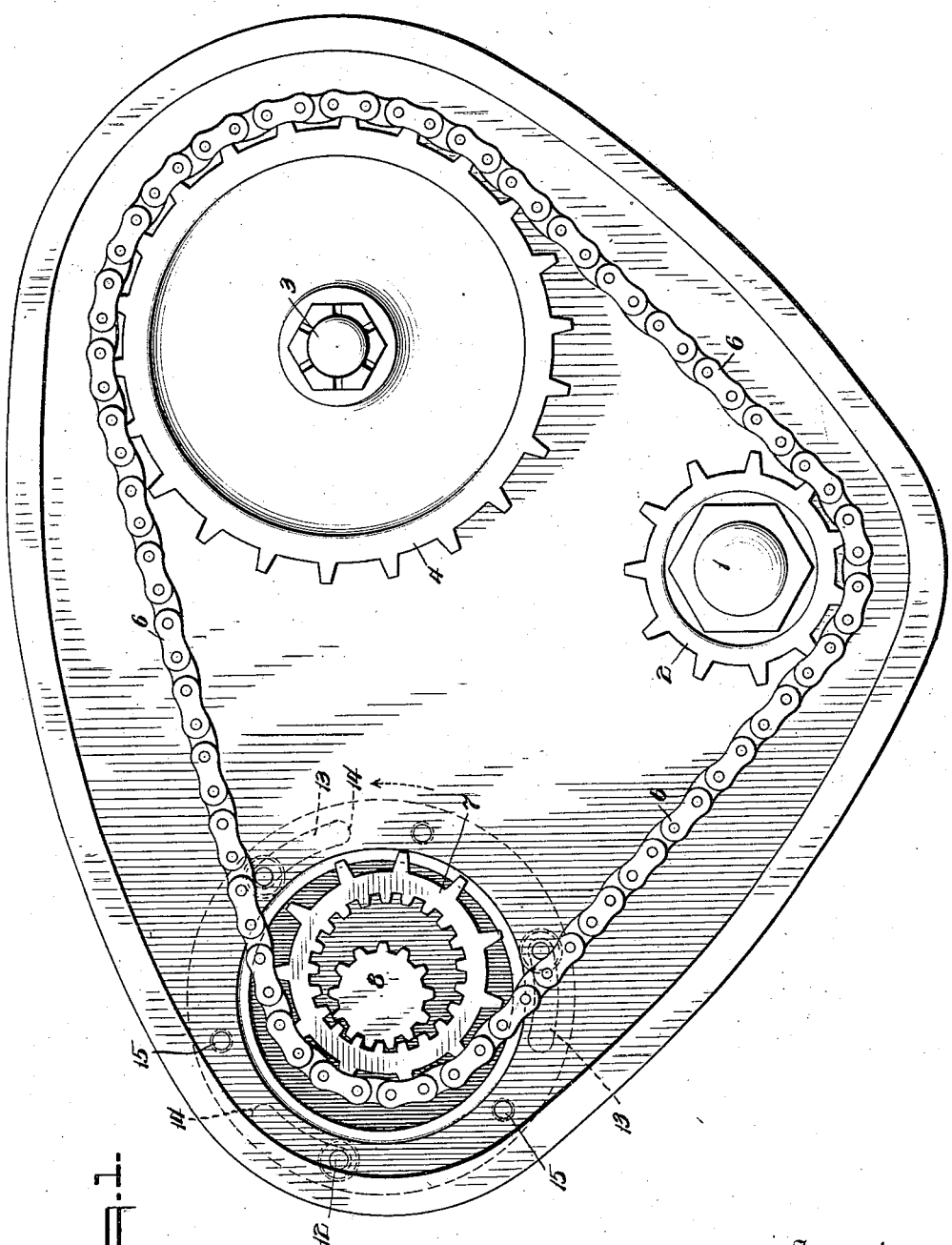
Inventor
Andrew L. Riker
By his Attorneys
Dunn, Goodlett, Massie & Scott

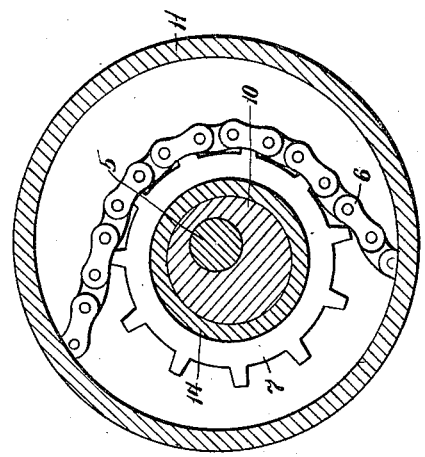
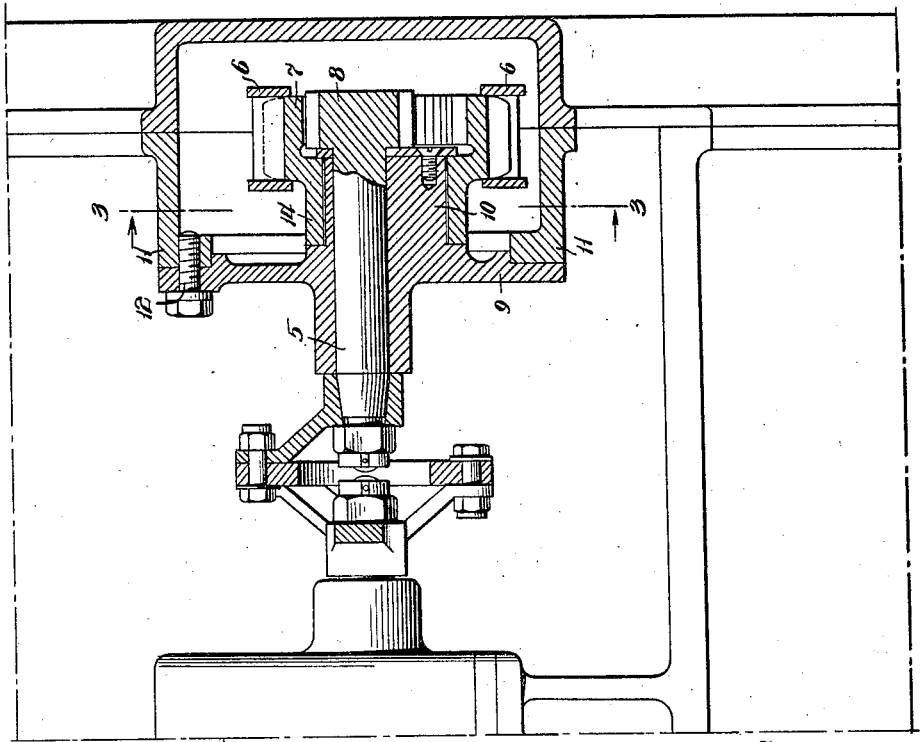

Patented Sept. 11, 1923.

1,467,591

UNITED STATES PATENT OFFICE.

ANDREW L. RIKER, OF FAIRFIELD, CONNECTICUT.

SPEED-CHANGING DEVICE AND TAKE-UP OF CHAIN DRIVES OR THE LIKE.

Application filed April 26, 1921. Serial No. 464,638.

*To all whom it may concern:*

Be it known that I, ANDREW L. RIKER, a citizen of the United States, residing at Fairfield, in the county of Fairfield and State of Connecticut, have invented new and useful Speed-Changing Devices and Take-Up of Chain Drives or the like, of which the following is a specification.

This invention relates to power-transmission mechanisms, and more particularly to such mechanisms embodying a drive-shaft and a driven-shaft together with a driving-member (such as a sprocket-chain) co-acting with said shafts to transmit power therebetween.

This invention is primarily intended to be used in connection with the motors of automobiles, in which a cam shaft is driven from the crank-shaft of the motor by means of a sprocket-chain co-acting with sprocket-gears carried by said shafts, in some cases the chain also co-acting with one or more additional shafts for driving auxiliary devices such as a magneto and water-pump. But the invention in its broadest aspect is applicable to any power-transmission mechanism embodying two or more shafts as aforesaid.

In mechanisms of this type, it is frequently desirable to operate the driven-shaft at a speed different from that of the drive-shaft, which has been ordinarily accomplished by the employment for the driven-shaft of a pulley having a different external diameter, or a sprocket-gear having a different number of teeth, from the pulley or sprocket-gear carried by the drive-shaft. This sometimes necessitates the use of either a very large sprocket-gear on the slow-turning shaft or a very-small gear on the fast-turning shaft, in either case the drive being less efficient than if pulleys or sprocket-gears of more nearly equal size were carried by both shafts.

One object of this invention, then, is to provide a construction wherein a drive-shaft and one or more driven-shafts carrying pulleys or sprocket-gears may, by means of a driving-member such as a belt or chain co-acting therewith, be driven at a speed independent of the ratio of the external diameters of such pulleys or the number of external teeth of such sprocket-gears.

When such driving and driven-shafts are mounted with fixed centers, as is usual, the drive-chain will after considerable wear become slack, thereby causing a noisy drive, and some loss of power. Another object of this invention is therefore to provide a construction for taking up the slack of an endless driving-member co-acting with two or more fixed-center shafts.

The invention comprises broadly a member journalled eccentrically with respect to and co-acting with one of the shafts, and engaging the drive-chain which co-acts with the other shaft or shafts. The invention further comprises a structure wherein such eccentric-member consists of a double-gear, having external teeth in mesh with said drive-chain and internal teeth in mesh with a spur-gear on said shaft.

In its preferred form the invention further comprises journalling said eccentric-member on an axis which is adjustable in an orbit around the shaft with which said member co-acts. The invention further comprises means for properly mounting said eccentric-member or double-gear, and for suitably adjusting its axis. The invention further comprises the various other features of construction and arrangement hereinafter set forth and claimed. By reason of the main features aforesaid, the bulge or eccentricity of said eccentric can be adjusted by rotation about the axis to take up the slack which occurs in these chain-drives after considerable use.

The invention will be best understood by reference to the accompanying drawings, which illustrate a preferred embodiment thereof, and in which—

Fig. 1 is a face view showing a sprocket-chain passing around a driving-sprocket and also around two other sprocket-wheels;

Fig. 2 is a longitudinal section through one of the two driven-shafts and its adjacent parts, the view being at right angles to that of Fig. 1; and Fig. 3 is a section taken on the line 3—3 of Fig. 2 as seen in the direction of the arrows.

In the drawings, 1 represents the crank-shaft of an automobile-engine, carrying a sprocket-wheel 2; and 3 is the cam-shaft of said engine, parallel to shaft 1 and carrying the sprocket-wheel 4. 5 is a third shaft, parallel to the other two, to be driven faster than shaft 1, for actuating some other instrumentality (such, for example, as the magneto, pump, generator, or ignition-system). 6 is a sprocket-chain passing around the sprocket-wheels 2 and 4 and likewise around a third sprocket-wheel 7 arranged to co-act with said third shaft 5. Said sprocket-wheel 7 is a double-gear, having its exterior spur-teeth in mesh with said chain 6, and its internal teeth in mesh with an interior pinion, such as spur gear 8, secured rigidly and concentrically upon said third shaft 5, and having fewer teeth than the internal teeth of said wheel 7. The two gears of said double-gear wheel 7, and also said gear 8 and the sprocket-chain, all lie within the same zone transverse to said shaft 5, as clearly indicated by Fig. 2, so that driving-power applied to either said internal gear or said external gear will be received by, and transmitted by, the other of said gears in that same transverse zone, at right-angles to said shaft 5, thereby avoiding any tendency to diagonal tilt or strain. Said shaft 5 is journalled in a plate 9, which has an eccentric cylindrical sleeve or arbor 10 surrounding the bore of said shaft, and is itself secured for rotary adjustment upon a portion 11 of the frame of the engine. As shown in Fig. 1, such rotary adjustment may be attained by means of bolts 12 passed through concentric slots 13. Upon said eccentric arbor 10 is journalled a sleeve 14 with which said double-gear 7 is cast or otherwise made fast, in position for its internal teeth to mesh with the aforesaid pinion 8 while its external teeth co-act with said chain 6. Said member 14—7 is thus an eccentric with respect to shaft 5.

In the specific illustration shown in the drawings, the relative speed of shafts 1 and 5 is due not only to the ratio of external sprocket-teeth on wheels 2 and 7, but also to the ratio of the internal teeth to the teeth on gear 8 carried by said shaft 5. It is thus possible to provide any desired ratio of the speeds of the driving and driven-shafts by means of the difference in number of teeth on such internal gear and the interior gear in mesh therewith, without having to resort to undue disproportion of the external dimensions of the driving and driven members such as gears 2 and 7.

At the outset, said plate 9 will be so positioned that the maximum bulge or eccentricity of said arbor 10, and therefore of said double-gear 7, will lie towards the center of the triangle formed by the three shafts aforesaid, and its minimum eccentricity will be 180 degrees opposite, at which point the internal teeth of the gear 7 will be in mesh with pinion 8, all as indicated in Fig. 1. When the chain has become slack, the bolts 12 are loosened, and the member 9—10 rotated axially (as indicated by the arrow in Fig. 1) so as to cause some of the bulge or eccentricity to protrude beyond the normal tangential line of the chain passing from sprocket 4 to sprocket 7, thereby taking up the slack of said chain; and then, of course, the bolts will be again tightened. Such adjustment may be repeated and the eccentricity carried still further outward, as occasion may require, until the ends 14 of the slots abut against their respective bolts 12. The slots may be made longer than shown in Fig. 1, and additional screw-threaded holes as 15, provided in the frame 11, to receive the bolts 12 to permit further adjustment after the plate 9 has reached the limit possible with the bolts in the original holes as shown in Fig. 1.

Although the invention has been described in considerable detail, and as applied to three fixed-center shafts of an automobile engine, yet this is given only for the sake of clearness; since the invention is not limited to the precise construction and arrangement set forth, and can be applied to tightening some other form of endless driving-members, such as a belt-drive or a rope-drive, as well as a chain-drive. It is further obvious that the invention can also be applied for tightening such driving-means when co-operating with any two or more fixed-center shafts. And in its broad form (without reference to adjustability) the invention is applicable to changing the speed-ratio in either direction, that is, for speeding up shaft 5 (as a driven-shaft) with respect to shaft 1 (as a drive-shaft), or vice versa.

The invention having thus been described, what is claimed is:

1. The combination of at least two parallel fixed-center shafts, driving-means such as a sprocket-chain co-acting therewith, a spur-gear secured on one of said shafts, an axially-adjustable member in which said shaft is journalled, an eccentric arbor carried by said member and surrounding said shaft, a sleeve journalled upon said arbor and carrying outwardly-projecting external teeth engaged by said driving-means, said sleeve likewise carrying inwardly-projecting internal teeth located in the same transverse zone as said external teeth, and said spur-gear, said internal teeth being in direct mesh with said spur-gear.

2. The combination of two fixed-center shafts, a driving-member such as a sprocket-chain for driving one from the other, a spur-gear secured on one of said shafts, a double-gear encircling said shaft and having outwardly-projecting teeth in operative-engagement with said driving-member and having inwardly-projecting gear teeth lying in the same transverse zone with said external teeth and said spur-gear and in direct mesh with said spur-gear, said double-gear being rotatable on an axis eccentric to said shaft, and means for shifting the axis of said double-gear to take up the slack of said driving-member.

3. The combination of at least two shafts, driving-means such as a sprocket-chain coacting therewith, a spur-gear secured on one of said shafts, an eccentric arbor in which said shaft is journalled, a sleeve journalled upon said arbor and carrying outwardly-projecting external teeth engaged by said driving-means, said sleeve likewise carrying inwardly-projecting internal teeth in the same transverse zone as said external teeth and said spur-gear, said internal teeth being in direct mesh with said spur-gear.

ANDREW L. RIKER.